United States Patent
Wang et al.

(10) Patent No.: US 10,841,784 B2
(45) Date of Patent: Nov. 17, 2020

(54) AUTHENTICATION AND KEY AGREEMENT IN COMMUNICATION NETWORK

(71) Applicant: Nokia Technologies Oy, Espoo (FI)

(72) Inventors: Mingjun Wang, Shaanxi (CN); Zheng Yan, Shaanxi (CN)

(73) Assignee: Nokia Technologies Oy, Espoo (FI)

( * ) Notice: Subject to any disclaimer, the term of this patent is extended or adjusted under 35 U.S.C. 154(b) by 197 days.

(21) Appl. No.: 16/062,581

(22) PCT Filed: Dec. 24, 2015

(86) PCT No.: PCT/CN2015/098746
§ 371 (c)(1),
(2) Date: Jun. 14, 2018

(87) PCT Pub. No.: WO2017/107143
PCT Pub. Date: Jun. 29, 2017

(65) Prior Publication Data
US 2018/0376318 A1    Dec. 27, 2018

(51) Int. Cl.
*H04W 8/04* (2009.01)
*H04W 12/04* (2009.01)
(Continued)

(52) U.S. Cl.
CPC ............... *H04W 8/04* (2013.01); *H04L 9/006* (2013.01); *H04L 9/083* (2013.01); *H04L 9/0825* (2013.01);
(Continued)

(58) Field of Classification Search
CPC ......... H04W 8/04; H04W 4/70; H04W 76/14; H04W 12/04031; H04W 12/02;
(Continued)

(56) References Cited

U.S. PATENT DOCUMENTS 9,705,856 B2    7/2017  Gehrmann et al.
2010/0111308 A1  5/2010  Forsberg et al.
(Continued)

OTHER PUBLICATIONS

Zhou et al., (Enforcing Role-Based Access Control for Secure Data Storage in the Cloud, The Computer Journal, vol. 54 No. 10, 2011, pp. 1675-1687) (Year: 2011).*
(Continued)

*Primary Examiner* — Oleg Korsak
(74) *Attorney, Agent, or Firm* — Mintz Levin Cohn Ferris Glovsky and Popeo, P.C.

(57) ABSTRACT

A method for authentication and key agreement in a communication network is disclosed. In the method, a network node generates a common public key and a master secret key, assigns to a first user equipment a first set of one or more pseudonym identifications corresponding to a real identity of the first user equipment, the common public key and a first private key specific to the first user equipment, and assigns to a second user equipment a second set of one or more pseudonym identifications corresponding to a real identity of the second user equipment, the common public key and a second private key specific to the second user equipment. In response to a request for establishing a communication session between the first user equipment with a first pseudonym identification and the second user equipment with a second pseudonym identification, the network node generates a first intermediate key for the first user equipment based on the common public key and a second secret key shared between the second user equipment and the network node, and a second intermediate key for the second user equipment based on the common public key and a first secret key shared between the first user equipment and the network node. Upon successfully authenticate each other based on the common public key, the first and second user equipments generate a session key to be used for securing
(Continued)

the communication session based on the first and second intermediate keys respectively.

18 Claims, 5 Drawing Sheets

(51) Int. Cl.
| | |
|---|---|
| *H04L 9/32* | (2006.01) |
| *H04L 29/06* | (2006.01) |
| *H04W 12/02* | (2009.01) |
| *H04L 9/00* | (2006.01) |
| *H04L 9/08* | (2006.01) |
| *H04W 76/14* | (2018.01) |
| *H04W 4/70* | (2018.01) |
| *H04W 12/06* | (2009.01) |
| *H04W 8/00* | (2009.01) |

(52) U.S. Cl.
CPC .......... *H04L 9/0838* (2013.01); *H04L 9/3255* (2013.01); *H04L 9/3273* (2013.01); *H04L 63/062* (2013.01); *H04L 63/0869* (2013.01); *H04W 4/70* (2018.02); *H04W 12/02* (2013.01); *H04W 12/04* (2013.01); *H04W 12/04031* (2019.01); *H04W 12/06* (2013.01); *H04W 76/14* (2018.02); *H04L 2209/42* (2013.01); *H04W 8/005* (2013.01)

(58) Field of Classification Search
CPC ...... H04W 12/04; H04W 12/06; H04L 9/006; H04L 9/0825; H04L 9/083; H04L 9/0838; H04L 9/3255; H04L 9/3273; H04L 63/062; H04L 63/0869
See application file for complete search history.

(56) References Cited

U.S. PATENT DOCUMENTS

| | | |
|---|---|---|
| 2011/0264914 A1 | 10/2011 | Bae et al. |
| 2015/0222439 A1 | 8/2015 | Bhattacharya et al. |
| 2016/0065362 A1* | 3/2016 | Choyi ................. H04L 63/065 380/279 |
| 2016/0142214 A1 | 5/2016 | Ekberg et al. |

OTHER PUBLICATIONS

Zhang et al., (SeDS: Secure Data Sharing Strategy for D2D Communication in LTE-Advanced Networks, IEEE, 14 pages, Mar. 23, 2015) (Year: 2015).*

Lablans et al. (A RESTful interface to pseudonymization services in modern web applications, BMC Med Inform Decis Mak. 2015; Published online Feb. 7, 2015, 10 pages) (Year: 2015).*

* cited by examiner

Figure 5 ns in vicinity. In
AUTHENTICATION AND KEY AGREEMENT IN COMMUNICATION NETWORK

CROSS REFERENCE TO RELATED APLICATIONS

This application is a national-phase entry of Patent Cooperation Treaty Application No. PCT/CN2015/098746 filed Dec. 24, 2015, entitled "AUTHENTICATION AND KEY AGREMENT IN COMMUNICATION NETWORK," the contents of which are hereby incorporated by reference in their entirety.

TECHNICAL FIELD OF THE INVENTION

The present invention relates to network security field, and more particularly to authentication and key agreement in a communication network.

BACKGROUND OF THE INVENTION

Communication security technology is one of the most important technologies for a communication network. To secure communications between communication parties, it is necessary to perform authentication of the communication parties and key agreement between the communication parties. The authentication refers to verify identity authenticity of the communication parties, and the key agreement refers to agree a session key to be used for securing the communication.

Recent demands on the communication network include improvement of network performance in terms of overall throughput, spectrum utilization, energy consumption, and so on. Device-to-Device (D2D) communication technology has been proposed as one of the technologies for communications in vicinity.

D2D communication technology refers to a type of technology that enables wireless devices in vicinity to communicate directly with each other under the control of networking infrastructures such as Access Point (AP), Base Station or Node B or eNode B, and core network. It has shown great potential in improving communication capability, reducing communication delay and power dissipation, as well as fostering multifarious new applications and services.

In recent years, many researches and developments have been conducted for D2D communications in various aspects, for example, system architecture, application scenarios, communication mode selection, resource allocation, power control, interference control, use cases, etc. New application scenarios and system architecture of D2D communications expose D2D communications into unique security threats, so it is essential to provide secure D2D communications. An important security issue of D2D communications is authentication and key agreement for wireless devices to establish a secure D2D communication channel.

Due to special characteristics of D2D communications, such as the unique system architecture, application scenarios, and use cases, many security issues of D2D communications are distinct from the conventional cellular networking.

In communications in the conventional cellular networking, such as Long Term Evolution (LTE) networking, the communication model is centralized. User equipments (UE) can only communicate with other UEs through eNode B or core network nodes. Such the communications between UEs can be protected using Evolved Packet System Authentication and Key Agreement (EPS AKA) protocol under control of the eNode B or core network nodes. The UEs and eNode B or core network may perform authentication mutually, and generate session keys to protect the subsequent session.

However in D2D communications, security issues appear especially on the direct links between UEs in vicinity. In D2D communications between UEs, data confidentiality and integrity should be protected against eavesdropping and modification. Thus UEs should be able to mutually authenticate authenticity of identity with each other in order to prevent against impersonation attack. Moreover UEs should be able to agree a session key to protect the data communication in a D2D session. In addition, UE in a D2D communication may not want to reveal its personal information to the other UE, such as real identity, location information, etc., to protect privacy. Therefore it is necessary to provide a security scheme for D2D communications to meet the above security requirements, especially in the aspect of authentication and key agreement.

The same security issues and security requirement also exist in the communication network which supports direct communications between terminal devices, for example, Internet of Things (IoT), Machine-to-Machine (M2M) network, Peer-to-Peer (P2P) network, sensor network, or mesh network.

Currently many security schemes have been proposed to implement user authentication and key agreement. But these security schemes do not consider the privacy protection of UEs in the communication session at all.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention are directed to methods for authentication and key agreement in a communication network and apparatuses thereof.

According to one embodiment of the present invention, there is provided a method for authentication and key agreement in a communication network. In the method, a common public key and a master secret key are generated at a network node. A first user equipment is assigned with a first set of one or more pseudonym identifications corresponding to a real identity of the first user equipment, the common public key and a first private key specific to the first user equipment. A second user equipment is assigned with a second set of one or more pseudonym identifications corresponding to a real identity of the second user equipment, the common public key and a second private key specific to the second user equipment. In response to a request for establishing a communication session between the first user equipment with a first pseudonym identification and the second user equipment with a second pseudonym identification, a first intermediate key is generated for the first user equipment based on the common public key and a second secret key shared between the second user equipment and the network node, and a second intermediate key is generated for the second user equipment based on the common public key and a first secret key shared between the first user equipment and the network node. The first and second intermediate keys are used by the first and second user equipments respectively to generate a session key to be used for securing the communication session upon the first and second user equipments successfully authenticate each other based on the common public key.

According to another embodiment of the present invention, there is provided a method for authentication and key agreement in a communication network. In the method, at a first user equipment, a set of one or more pseudonym identifications corresponding to a real identity of the first user equipment, a common public key and a first private key specific to the first user equipment are obtained from a network node. A request is sent for establishing a communication session between the first user equipment with a first pseudonym identification and a second user equipment with a second pseudonym identification, and a first intermediate key for the first user equipment is received from the network node. Authentication is performed at the first user equipment with the second user equipment based on the common public key. Upon the successful authentication, a session key to be used for securing the communication session is generated at the first user equipment based on the first intermediate key.

According to another embodiment of the present invention, there is provided an apparatus for authentication and key agreement in a communication network. The apparatus comprises at least one processor and at least one memory including computer program code, wherein the at least one memory and the computer program code are configured to, with the at least one processor, cause the apparatus to perform at least the following: generating, at a network node, a common public key and a master secret key; assigning, to a first user equipment, a first set of one or more pseudonym identifications corresponding to a real identity of the first user equipment, the common public key and a first private key specific to the first user equipment; assigning, to a second user equipment, a second set of one or more pseudonym identifications corresponding to a real identity of the second user equipment, the common public key and a second private key specific to the second user equipment; and generating, in response to a request for establishing a communication session between the first user equipment with a first pseudonym identification and the second user equipment with a second pseudonym identification, a first intermediate key for the first user equipment based on the common public key and a second secret key shared between the second user equipment and the network node, and a second intermediate key for the second user equipment based on the common public key and a first secret key shared between the first user equipment and the network node, the first and second intermediate keys being used by the first and second user equipments respectively to generate a session key to be used for securing the communication session upon the first and second user equipments successfully authenticate each other based on the common public key.

According to another embodiment of the present invention, there is provided an apparatus for authentication and key agreement in a communication network. The apparatus comprises at least one processor and at least one memory including computer program code, wherein the at least one memory and the computer program code are configured to, with the at least one processor, cause the apparatus to perform at least the following: obtaining, at a first user equipment and from a network node, a set of one or more pseudonym identifications corresponding to a real identity of the first user equipment, a common public key and a first private key specific to the first user equipment; sending a request for establishing a communication session between the first user equipment with a first pseudonym identification and a second user equipment with a second pseudonym identification; receiving, from the network node, a first intermediate key for the first user equipment; performing, at the first user equipment, authentication with the second user equipment based on the common public key; and generating a session key to be used for securing the communication session based on the first intermediate key upon the successful authentication.

According to another embodiment of the present invention, there is provided a computer program product, which includes one or more sequences of one or more instructions which, when executed by one or more processors, cause an apparatus to at least perform the steps of the above method for authentication and key agreement in a communication network.

According to another embodiment of the present invention, there is provided an apparatus for authentication and key agreement in a communication network. The apparatus comprises: means for generating, at a network node, a common public key and a master secret key; means for assigning, to a first user equipment, a first set of one or more pseudonym identifications corresponding to a real identity of the first user equipment, the common public key and a first private key specific to the first user equipment; means for assigning, to a second user equipment, a second set of one or more pseudonym identifications corresponding to a real identity of the second user equipment, the common public key and a second private key specific to the second user equipment; and means for generating, in response to a request for establishing a communication session between the first user equipment with a first pseudonym identification and the second user equipment with a second pseudonym identification, a first intermediate key for the first user equipment based on the common public key and a second secret key shared between the second user equipment and the network node, and a second intermediate key for the second user equipment based on the common public key and a first secret key shared between the first user equipment and the network node, the first and second intermediate keys being used by the first and second user equipments respectively to generate a session key to be used for securing the communication session upon the first and second user equipments successfully authenticate each other based on the common public key.

According to another embodiment of the present invention, there is provided an apparatus for authentication and key agreement in a communication network. The apparatus comprises: means for obtaining, at a first user equipment and from a network node, a set of one or more pseudonym identifications corresponding to a real identity of the first user equipment, a common public key and a first private key specific to the first user equipment; means for sending a request for establishing a communication session between the first user equipment with a first pseudonym identification and a second user equipment with a second pseudonym identification; means for receiving, from the network node, a first intermediate key for the first user equipment; means for performing, at the first user equipment, authentication with the second user equipment based on the common public key; and means for generating a session key to be used for securing the communication session based on the first intermediate key upon the successful authentication.

Generally, all terms used in this specification are to be interpreted according to their ordinary meaning in the technical field, unless explicitly defined otherwise herein. All references to "a/an/the [element, device, apparatus, component, means, step, etc]" are to be interpreted openly as referring to at least one instance of said element, device, apparatus, component, means, step, etc., unless explicitly stated otherwise. The steps of any method disclosed herein do not have to be performed in the exact order disclosed, unless explicitly stated.

Those skilled in the art will appreciate that the above is merely an introduction to the subject matter described in more detail below. Other objectives, features and advantages of the present invention will appear from the following detailed disclosure, from the attached dependent claims as well as from the drawings.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF THE EMBODIMENTS

In the following description of the various illustrative embodiments, reference is made to the accompanying drawings, which form a part thereof, and in which are shown by way of illustration various exemplary embodiments in which the invention may be practiced. It is to be understood that other embodiments may be utilized and structural and functional modifications may be made without departing from the scope of the present invention.

The authentication and key agreement provided in the embodiments of the present invention is based on group signature technology and Diffie-Hellman Key Exchange (DHKE) scheme, and further takes into account the privacy protection.

Figure 1:
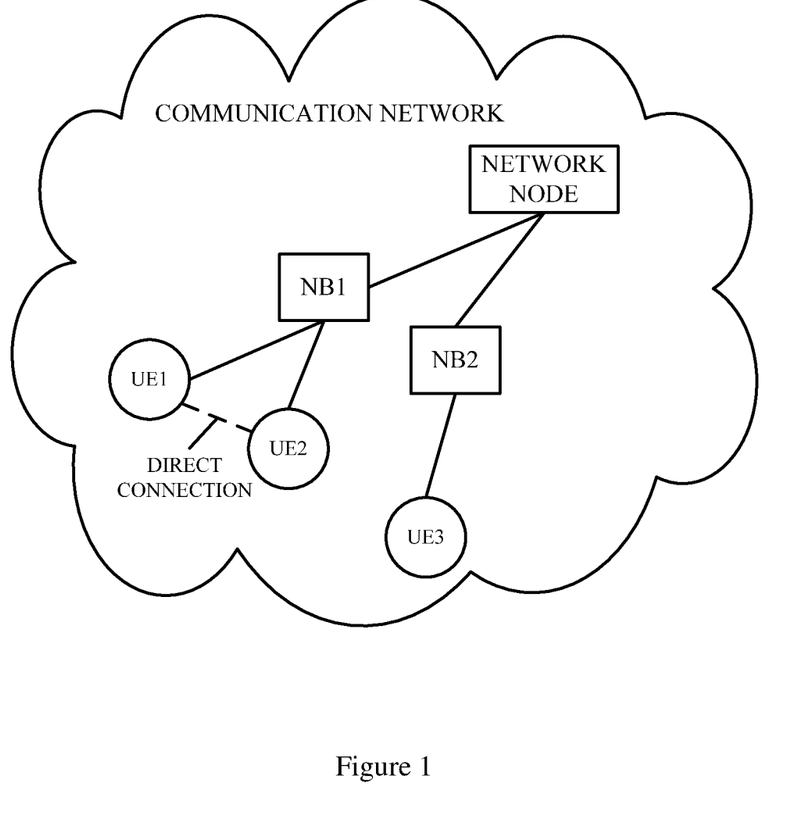
FIG. 1 is an exemplary diagram of a communication network in which the methods for authentication and key agreement of embodiments of the present invention can be implemented.

FIG. 1 shows an exemplary diagram of a communication network in which the methods for authentication and key agreement of the embodiments of the present invention can be implemented. The communication network may be, for example, 3G communication network, 4G communication network such as LTE network, or 5G communication network such as LTE-Advanced network. The communication network may support D2D communications. As shown in FIG. 1, the communication network comprises a core network, a plurality of (e)NodeBs (e.g. NB1, NB2 in FIG. 1) and a plurality of UEs (e.g. UE1, UE2, UE3 in FIG. 1). In general, one of the UEs may communicate with another UE through the NodeBs or core network nodes. The UEs may establish secure associations with the NodeBs and core network nodes. Also the UE may establish a direct connection with another UE to communicate with each other under control of the core network node. For example, UE1 wants to set up a secure D2D connection with UE2 for the purpose of media content sharing. UE1 may send a request for establishing a D2D connection with UE2 to the core network node. Under control of the core network node, both UE1 and UE2 may mutually authenticate whether its communication party is legal for D2D communications by means of the group signature technology, and then agree a session key to be used for securing data communication over the D2D connection by means of DHKE scheme. In the process of establishment of the secure D2D connection, neither UE1 nor UE2 knows anything about the other party's real identity.

It should be noted that the communication network may also be Internet of Things (IoT), Machine-to-Machine (M2M) network, Peer-to-Peer (P2P) network, sensor network, mesh network, or any other communication network which may support direct communications between terminal devices.

In the communication network as shown in FIG. 1, the UEs and the core network node cooperatively implement the authentication and key agreement according to the embodiments of the present invention. The core network node may be a mobility management entity (MME), a home subscriber server (HSS), or an authentication server. The UE may be, for example, a mobile phone, a smart phone, a laptop computer, a tablet computer, a wearable device such as a watch, a sensor, any electronic device with communication function, etc.

The followings are brief introductions to the group signature technology and the DHKE scheme.

The group signature technology is a kind of group based authentication to achieve privacy protection of signers against potential verifiers. A group manager may create a group and generate a group public key, which is public to any member of a group and the potential verifiers. The group manager may also generate a private key specific to the member of the group and provide it to the member. Each member of the group may sign a message using its private key on behalf of the group, and such signature is the group signature. The group signature is publicly verifiable using the group public key of the group, but the verifiers do not know who signs the group signature. Therefore the group signature technology may provide anonymity of the actual signer. Only the group manager can link the group signature to the real identity of the signer.

The DHKE scheme is a key distribution scheme based on Discrete Logarithm Problem (DLP). It enables two parties P1, P2 to derive a common secret key from public keys (which is also referred to as "key hint") exchanged over an insecure channel. The basic idea of the DHKE scheme is expressed an equation as follows:

$$k = (x^a)^b \bmod q = (x^b)^a \bmod q$$

where k indicates the common secret key which can be used as a session key for securing data communication between the two parties, q indicates a prime number, x indicates a primitive root of q, a indicates the private key generated by the party P1, and b indicates the private keys generated by the party P2. The party P1 may compute $x^a$ and communicates it to the party P2. The party P2 may compute $x^b$ and communicates it to the party P1. Then the two parties P1, P2 may generate the common secret key based on $x^b$ and $x^a$, respectively. $x^a$ and $x^b$ may be considered as the key hints.

The two parities only need to exchange their public keys and compute the common secret key separately based on the received public keys.

Figure 2:
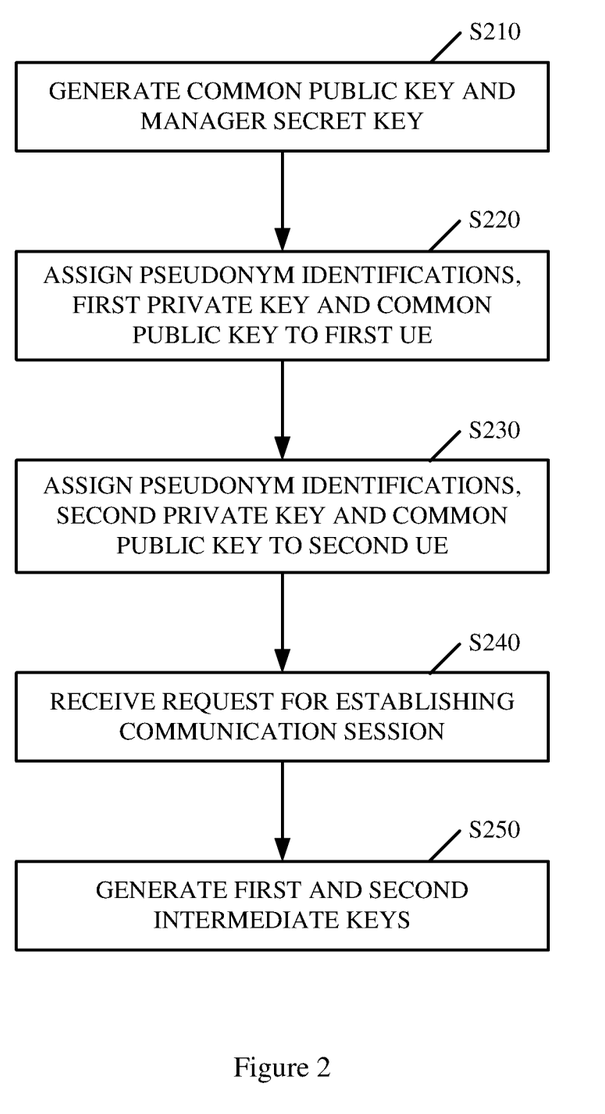
FIG. 2 is a flowchart illustrating the method for authentication and key agreement in a communication network according to a first embodiment of the present invention.

FIG. 2 is a flowchart illustrating the method for authentication and key agreement in a communication network according to a first embodiment of the present invention. In this embodiment, the method can be executed at or by a network node, which may be a single network entity specific to manage communication security or may be any existing core network node such as MME, HSS, or authentication server, or combination thereof.

As shown in FIG. 2, at step S210, the network node generates a common public key $G_{pk}$ and a master secret key $G_{msk}$. The common public key $G_{pk}$ is used as a group public key to verify a group signature and is public to any UE in a communication group. The master secret key $G_{msk}$ may be used to generate private keys for UEs and open a signature to recover a signer's real identity. The master secret key $G_{msk}$ is private and only the group master, i.e. the network node, knows it. In some embodiments of the present invention, the network node may set up a D2D communication system as the communication group. In this case, the network node acts as a group manager. The D2D communication system may be a part or whole of the communication network as shown in FIG. 1. The UE may become the member of the communication group upon registration of D2D communication service.

Those skilled in the art will appreciate that the network node may also set up a M2M communication system, or a P2P communication system, etc., as the communication group.

Additionally, the network node may generate a group identifier $G_{ID}$ for the communication group, to distinguish from other communication groups generated in different types of communication network.

There have been many methods for generation of the common public key and generation of the master secret key in the art, which are known to those skilled in the art. In this embodiment, any existing methods for generating the common public key and for generating the master secret key can be used.

At step S220, the network assigns, to a first UE, $UE_1$, a first set of pseudonym identifications $\{PID_1\}$ corresponding to a real identity $RID_1$ of $UE_1$, the common public key $G_{pk}$ generated at step S210 and a first private key $U_{sk1}$ specific to $UE_1$.

In some embodiments of the present invention, the assignment may be responsive to a subscription request for registering a communication service (e.g. direct communication services such as D2D communication services, M2M communication services, or P2P communication services, etc.) from the UE. The UE may send its real identity RID along with the subscription request. Once receiving the subscription request and the UE's real identity RID, the network node may generate a set of pseudonym identifications $\{PID\}$ for the UE. The pseudonym identification may be randomly generated and associated with the real identity RID. The set of pseudonym identifications $\{PID\}$ may comprise one or more pseudonym identifications. Any of the pseudonym identifications may replace the real identity in the D2D communications, so as to protect the privacy of the UE. The network node may maintain the correspondence between the real identity RID and the set of pseudonym identifications $\{PID\}$ for each registered UE.

Meanwhile the network node may generate a private key $U_{sk}$ specific to the UE for signing a message to generate the group signature. In some embodiments of the present invention, the private key $U_{sk}$ may be generated based on the real identity RID of the UE, the common public key $G_{pk}$ and the master secret key $G_{msk}$.

After generating the pseudonym identifications $\{PID\}$ and the private key $U_{sk}$, the network node transmits the set of pseudonym identifications $\{PID\}$, the common public key $G_{pk}$ and the private key $U_{sk}$ to the UE through a secure channel. The secure channel may be pre-established between the UE and the network node.

In this step, the network node generates the first set of pseudonym identifications $\{PID_1\}$ and the first private key $U_{sk1}$ for $UE_1$, and sends the first set of pseudonym identifications $\{PID_1\}$, the common public key $G_{pk}$ and the first private key $U_{sk1}$ to the $UE_1$. The network node also stores and maintains the correspondence between the real identity $RID_1$ and the first set of pseudonym identifications $\{PID_1\}$ of $UE_1$.

At step S230, the network node assigns, to a second UE, $UE_2$, a second set of pseudonym identifications $\{PID_2\}$ corresponding to the real identity $RID_2$ of $UE_2$, the common public key $G_{pk}$ and a second private key $U_{sk2}$ specific to $UE_2$. Similar to step S220, the network node may generate the pseudonym identifications $\{PID_2\}$ and the private key $U_{sk2}$ for $UE_2$ upon receiving the subscription request and the real identity $RID_2$ of $UE_2$, and transmits them together with the common public key $G_{pk}$ to $UE_2$, in the form of a tuple, for example. The network node may store and maintain the correspondence between the real identity $RID_2$ and the second set of pseudonym identifications $\{PID_2\}$ of $UE_2$.

It should be noted that steps S220, S230 may be executed in any order or concurrently. In addition, those skilled in the art will appreciate that the assignment as described in steps S220, S230 may be performed at any time as long as the network node obtains the UE's real identity RID.

After receiving the pseudonym identifications $\{PID\}$, the common public key $G_{pk}$ and the private key $U_{sk}$ from the network node, the UE may discover other UEs with the pseudonym identifications via discovery process. Any UE may initiate a communication session with the other UE. For example, $UE_1$ discovers $UE_2$ with a second pseudonym identification $PID_2$ via D2D discovery process and wants to share media contents with $UE_2$. Then $UE_1$ may send a request for establishing a D2D session with $UE_2$ to the network node. The request may comprise the real identity $RID_1$ of $UE_1$ and the second pseudonym identification $PID_2$ of $UE_2$.

Then at step S240, the network node receives the request for establishing a communication session between $UE_1$ and $UE_2$ from any one of $UE_1$ and $UE_2$. The request may be a request for establishing a direct session such as D2D session, P2P session, M2M session, etc. between UEs. From the received request, the network node may obtain the real identity RID of the requesting UE and the pseudonym identification PID of the requested UE. In the above example, $UE_1$ is the requesting UE and $UE_2$ is the requested UE. Thus the network node may determine a first pseudonym identification $PID_1$ for $UE_1$ based on the maintained correspondence between the real identity $RID_1$ and the pseudonym identifications $\{PID_1\}$ for $UE_1$.

At step S250, the network node generates a first intermediate key $Hint_1$ for $UE_1$ and a second intermediate key $Hint_2$ for $UE_2$. The first and second intermediate keys $Hint_1$, $Hint_2$ act as the key hints in the DHKE scheme, and will be used later by $UE_1$ and $UE_2$ respectively to generate the session key $K_{UE1-UE2}$ for securing the communication session between $UE_1$ and $UE_2$. As described above, in the DHKE scheme, the key hint is generated by the UE itself. However in the embodiments of the present invention, the key hints for the two UEs to generate the session key are generated at or by the network node and distributed to the corresponding UEs.

In some embodiments of the present invention, the network node may generate the intermediate key $Hint_n$ for $UE_n$ based on the common public key $G_{pk}$ and a secret key $SS_m$ which is shared between the network node and another UE, $UE_m$, with which $UE_n$ wants to establish the communication session. Each of the UEs has established a secure channel with the network node and shares the secret key SS which is unique to the UE with the network node. The network node may maintain the secret keys SSs of all the UEs, and the UE maintains its own secret key SS privately.

Specifically, for $UE_1$, the network node generates the first intermediate key $Hint_1$ based on the common public key $G_{pk}$ and the second secret key $SS_2$ shared between the network node and $UE_2$, and for $UE_2$, the network node generates the second intermediate key $Hint_2$ based on the common public key $G_{pk}$ and the first secret key $SS_1$ shared between the network node and $UE_1$.

In the process of generating the first and second intermediate keys $Hint_1$, $Hint_2$, the network node may first generate a random number RAND. Then the network node may generate the first intermediate key $Hint_1$ by performing exponentiation calculation on the common public key $G_{pk}$ with an exponent being a product of the second secret key $SS_2$ and the random number RAND. Meanwhile, the network node may generate the second intermediate key $Hint_2$ by performing exponentiation calculation on the common public key $G_{pk}$ with an exponent being a product of the first secret key $SS_1$ and the random number RAND. The first and second intermediate keys $Hint_1$, $Hint_2$ may be expressed by the following equations:

$$Hint_1 = (G_{pk})^{SS_2 \cdot RAND};$$

$$Hint_2 = (G_{pk})^{SS_1 \cdot RAND}.$$

After generating the first and second intermediate keys $Hint_1$, $Hint_2$, the network node may transmit the first intermediate key $Hint_1$ to $UE_1$ and transmit the second intermediate key $Hint_2$ to $UE_2$. In some embodiments of the present invention, the network node may transmit a communication session setup command to $UE_1$ and $UE_2$ respectively. The communication session setup command comprises the first or second intermediate keys $Hint_1$ or $Hint_2$. For the requested UE ($UE_2$ in this example), the communication session setup command also comprises the first pseudonym identification $PID_1$. It should be noted that the communication session setup command may comprise other parameters. $UE_1$ and $UE_2$ may generate the session key $K_{UE1-UE2}$ upon $UE_1$ and $UE_2$ successfully authenticate each other, which will be described in detail later, and then communicate with each other using the session key.

In some embodiments of the present invention, the first pseudonym identification is selected from the first set of pseudonym identifications of the first user equipment, and the second pseudonym identification is selected from the second set of pseudonym identifications of the second user equipment. Further the first and second identifications may be different in different communication sessions. Alternatively, the first and second identifications may be periodically changed.

In some embodiments of the present invention, the network node may open a group signature to obtain the real identity RID of a signer who issues the group signature. If there is a disputation for authenticity between the UEs in communications, any UE may send a suspected message and a suspected signature on the suspected message to the network node. Upon receipt of the suspected message and the suspected signature, the network node may verify validity of the suspected signature based on the common public key $G_{pk}$. If the suspected signature is verified to be valid, the network node may recover the real identity RID of the signer from the valid suspected signature, based on the master secret key $G_{msk}$. If the suspected signature is verified to be invalid, the network node does not open the suspected signature.

Figure 3:
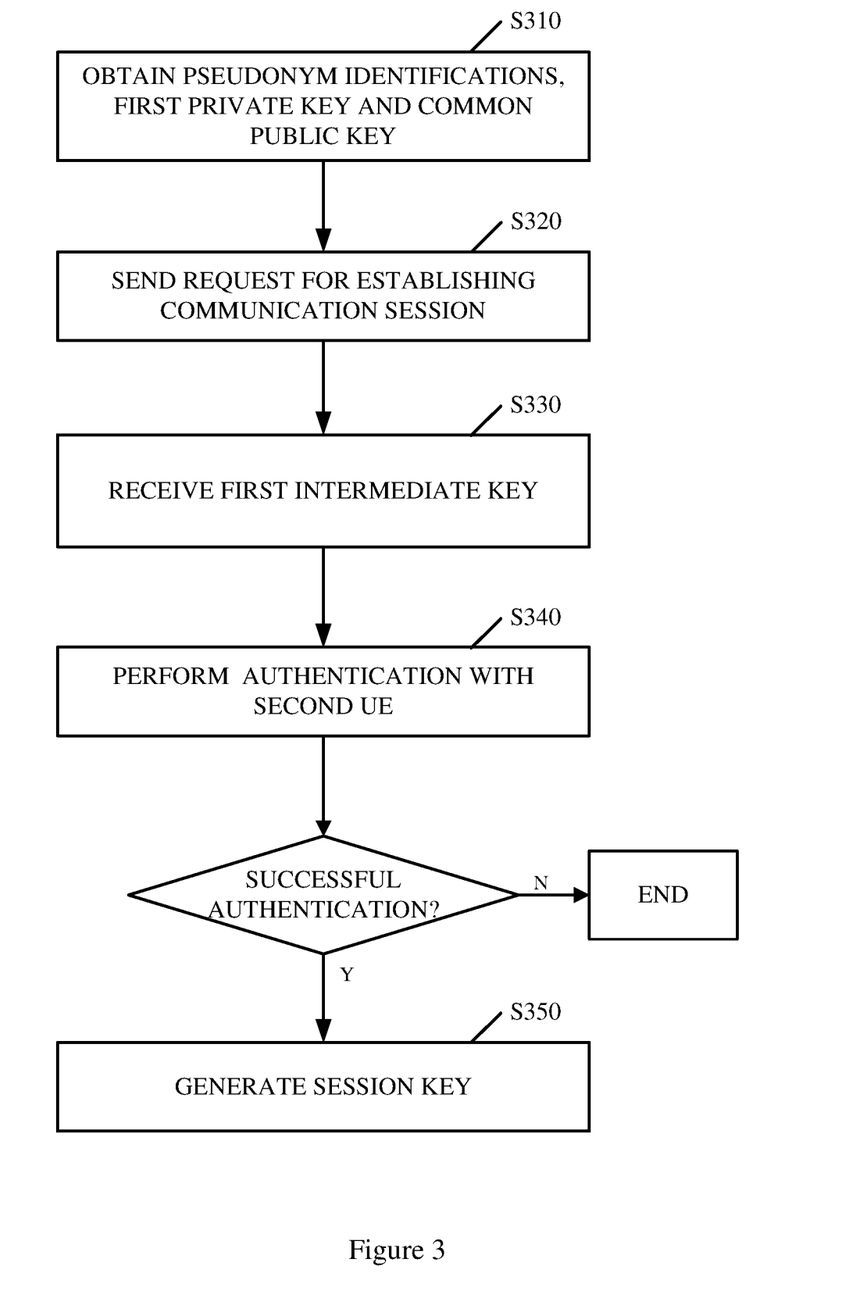
FIG. 3 is a flowchart illustrating the method for authentication and key agreement in a communication network according to a second embodiment of the present invention.

FIG. 3 is a flowchart illustrating the method for authentication and key agreement in a communication network according to a second embodiment of the present invention. In this embodiment, the method can be executed at or by any UE. The following description will be made from the perspective of the first UE, $UE_1$, for example.

As shown in FIG. 3, at step S310, $UE_1$ obtains a set of pseudonym identifications corresponding to its real identity $RID_1$, the common public key and the first private key from the network node. In some embodiments of the present invention, this step may be performed in the process of UE registration with the network node. Initially, $UE_1$ may send a subscription request and its real identity $RID_1$ to the network node to register a direct communication service (e.g. D2D communication services, M2M communication services, or P2P communication services, etc.). As described above, the network node may generate the common public key $G_{pk}$ and the master secret key $G_{msk}$ at the time of setting up the D2D communication system. When receiving the subscription request from $UE_1$, the network node may generate one or more pseudonym identifications $\{PID_1\}$ for $UE_1$ and generate the first private key $U_{sk1}$ based on the real identity $RID_1$ of $UE_1$, the common public key $G_{pk}$ and the master secret key $G_{msk}$. Then the network node replies to $UE_1$ by sending the pseudonym identifications $\{PID_1\}$, the common public key $G_{pk}$ and the first private key $U_{sk1}$ to $UE_1$. In addition, $UE_1$ has established the secure channel with the network node and shares the first secret key $SS_1$ with the network node.

After the registration, $UE_1$ may discover other UE with the pseudonym identification PID through the discovery process. If $UE_1$ want to establish a communication session with another UE, for example, $UE_2$ with the second pseudonym identification $PID_2$ selected from the second set of pseudonym identifications $\{PID_2\}$ of $UE_2$, $UE_1$ may send a request for establishing a communication session to the network node at step S320. The request may comprise the real identity $RID_1$ of $UE_1$ and the second pseudonym identifications $PID_2$ of $UE_2$. Then at step S330, $UE_1$ receives a first intermediate key $Hint_1$ $(=(G_{pk})^{SS_2 \cdot RAND})$ from the network node. For example, the first intermediate key $Hint_1$ may be included in the communication session setup command.

After receiving the communication session setup command, at step S340, $UE_1$ performs authentication with $UE_2$ based on the common public key $G_{pk}$. In some embodiments of the present invention, the authentication is based on the group signature technology. In this step, $UE_1$ may generate a first signature Gsgn(M1) for a first message M1 based on the first private key $U_{sk1}$. The first message M1 may comprise the first pseudonym identification $PID_1$ and the second pseudonym identification $PID_2$. Depending on the specific group signature technology, the common public key $G_{pk}$ may be used to generate the signature. As the first message M1 does not comprise the real identity $RID_1$ of $UE_1$, the first signature Gsgn(M1) is unlikable with the real identity $RID_1$ of $UE_1$. Then $UE_1$ sends the first message M1 and the first signature Gsgn(M1) to $UE_2$, and $UE_2$ may verify the validity of the first signature Gsgn(M1) using the common public key $G_{pk}$. If the first signature Gsgn(M1) is verified to be valid, which means that $UE_1$ is legal and thus successfully authenticated, $UE_2$ may generate the session key $K_{UE1-UE2}$. If the first signature Gsgn(M1) is verified to be invalid, it means that $UE_1$ is illegal and thus $UE_1$ is not successfully authenticated. Moreover, $UE_1$ may receive from $UE_2$ a second message M2 and a second signature Gsgn(M2) on the second message M2. The second message M2 may comprise the first pseudonym identification $PID_1$ and the second pseudonym identification $PID_2$. The second signature Gsgn(M2) is generated by $UE_2$ based on the second private key $U_{sk2}$ of $UE_2$. Then $UE_1$ may verify the validity of the second signature Gsgn(M2) using the common public key $G_{pk}$. If the second signature Gsgn(M2) is verified to be valid, which means that $UE_2$ is legal and thus successfully authenticated, $UE_1$ may generate the session key $K_{UE1-UE2}$ based on the first intermediate key $Hint_1$. If the second signature Gsgn(M2) is verified to be invalid, it means that $UE_2$ is illegal and thus $UE_2$ is not successfully authenticated.

Then if $UE_2$ is successfully authenticated, at step S350, $UE_1$ generates the session key $K_{UE1-UE2}$ based on the first intermediate $Hint_1$. In this step, $UE_1$ performs exponentiation calculation on the first intermediate key $Hint_1$ with an exponent being the first secret key $SS_1$ to generate the session key $K_{UE1-UE2}$. The session key $K_{UE1-UE2}$ may be expressed as the following equation:

$$K_{UE1-UE2}=(Hint_1)^{SS1}.$$

After $UE_1$ and $UE_2$ generate the session key $K_{UE1-UE2}$ respectively, the secure communication session can be established directly between $UE_1$ and $UE_2$, and $UE_1$ and $UE_2$ use the session key to protect the transmitted data.

In some embodiments of the present invention, if $UE_1$ suspects authenticity of a signer of a message, $UE_1$ may transmit the received message and the signature on the received message to the network node, and the network node may recover the real identity of the signer from the signature.

Figure 4:
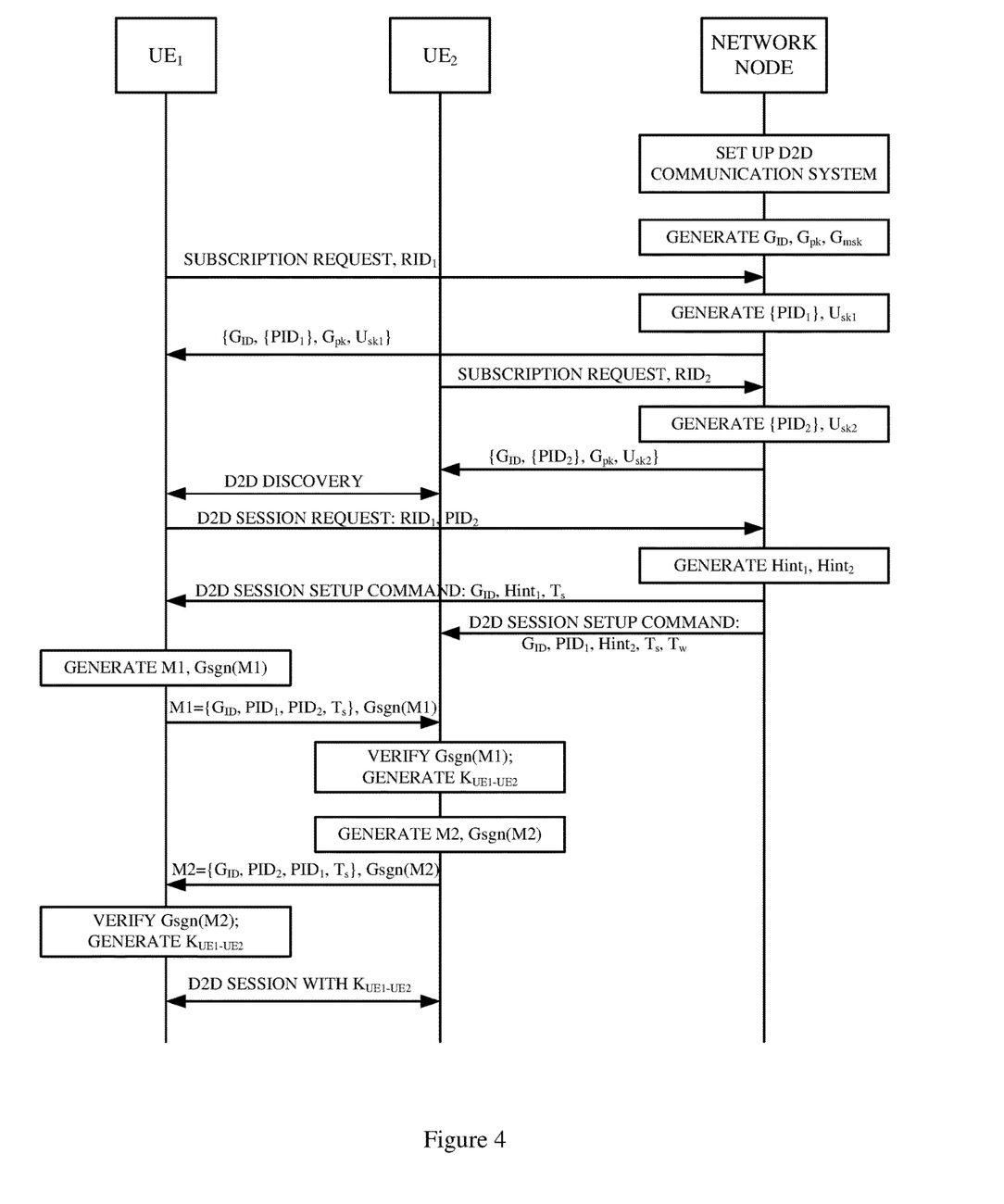
FIG. 4 is a diagram illustrating an exemplary procedure of the authentication and key agreement in D2D communications.

FIG. 4 is a diagram illustrating an exemplary procedure of the authentication and key agreement in D2D communications in the communication network as shown in FIG. 1. In the communication network, $UE_1$ and $UE_2$ have established the secure channels with the network node. The first secret key $SS_1$ is shared between $UE_1$ and the network node, and the second secret key $SS_2$ is shared between $UE_2$ and the network node.

As shown in FIG. 4, initially the network node sets up the D2D communication system and generates the group identifier $G_{ID}$, the common public key $G_{pk}$ and the master secret key $G_{msk}$. $UE_1$ sends the subscription request for registration and its real identity $RID_1$ to the network node. The network node generates the first set of pseudonym identifications $\{PID_1\}$ and the first private key $U_{sk1}$ for $UE_1$. Then the network node sends the group identifier $G_{ID}$, the first set of pseudonym identifications $\{PID_1\}$, the common public key $G_{pk}$ and the first private key $U_{sk1}$ to $UE_1$. Similarly $UE_2$ sends the subscription request and its real identity $RID_2$ to the network node and receives the group identifier $G_{ID}$, the second set of pseudonym identifications $\{PID_2\}$, the common public key $G_{pk}$ and the second private key $U_{sk2}$ from the network node.

Then $UE_1$ can discover $UE_2$ with the second pseudonym identification $PID_2$ via the D2D discovery process. $UE_2$ can also discover $UE_1$ with the first pseudonym identification $PID_1$. When $UE_1$ wants to establish a D2D session with $UE_2$, $UE_1$ sends a D2D session request to the network node. The D2D session request comprises the real identity $RID_1$ of $UE_1$ and the second pseudonym identification $PID_2$ of $UE_2$. The network node generates the first and second intermediate key $Hint_1$, $Hint_2$ for $UE_1$ and $UE_2$ respectively. The network node sends the D2D session setup command to $UE_1$ and $UE_2$. The D2D session setup command to $UE_1$ comprises the group identifier $G_{ID}$, the first intermediate key $Hint_1$ and a time stamp $T_s$. The D2D session setup command to $UE_2$ comprises the group identifier $G_{ID}$, the second intermediate key $Hint_2$, the first pseudonym identification $PID_1$ of $UE_1$, a time stamp $T_s$ and a waiting time $T_w$ for the D2D session setup. The waiting time $T_w$ indicates the time duration in which $UE_2$ wait for an authentication message from $UE_1$. If $UE_2$ does not receive any authentication message from $UE_1$ within the waiting time $T_w$, $UE_2$ will drop the D2D session setup command.

After receiving the D2D session setup command, $UE_1$ generates an authentication message M1 which comprises the group identifier $G_{ID}$, the first pseudonym identification $PID_1$, the second pseudonym identification $PID_2$, and the time stamp $T_s$, and signs the authentication message M1 using the first private key $U_{sk1}$ to generate the signature Gsgn(M1). Then $UE_1$ sends the authentication message M1 and the signature Gsgn(M1) to $UE_2$. $UE_2$ checks whether the authentication message M1 is received within the waiting time $T_w$ by checking the difference between the time stamp $T_s$ in the authentication message M1 and the time stamp $T_s$ in the D2D session setup command is less than the waiting time $T_w$. If the check result is positive, $UE_2$ verifies whether the signature Gsgn(M1) is valid based on the common public key $G_{pk}$. If the signature Gsgn(M1) is valid, $UE_2$ generates the session key $K_{UE1-UE2}$ based on the second intermediate key $Hint_2$ and the second secret key $SS_2$, i.e. $K_{UE1-UE2}=(Hint_2)^{SS2}$.

Meanwhile, $UE_2$ generates an authentication message M2 which comprises the group identifier $G_{ID}$, the second pseudonym identification $PID_2$, the first pseudonym identification $PID_1$, and the time stamp $T_s$, and signs the authentication message M2 using the second private key $U_{sk2}$ to generate the signature Gsgn(M2). Then UE2 sends the authentication message M2 and the signature Gsgn(M2) to $UE_1$. $UE_1$ verifies whether the signature Gsgn(M2) is valid based on the common public key $G_{pk}$. If the signature Gsgn(M2) is valid, $UE_1$ generates the session key $K_{UE1-UE2}$ based on the first intermediate key $Hint_1$ and the first secret key $SS_1$, i.e. $K_{UE1-UE2}=(Hint_1)^{SS1}$.

After generating the session key $K_{UE1-UE2}$, $UE_1$ and $UE_2$ may directly communicate with each other securely using the session key $K_{UE1-UE2}$.

Although the authentication and key agreement method according to the embodiments of the present invention has been described above with respect to D2D communications, those skilled in the art will appreciate that such the method may also be applied to M2M communications, P2P communications, etc.

The methods for authentication and key agreement in a communication network according to the embodiments of the present invention can assure anonymous authentication of UEs, secure the communications between the UEs, and preserve the privacy of the UE simultaneously.

In the above-described embodiments of the methods for authentication and key agreement in a communication network, UEs can mutually authenticate whether their communication parities are legal UEs, which greatly reduces the impersonate attacks. The session key is generated during the authentication process, and based on the intermediate key generated and distributed by the network node and the UE's shared secret key. The network node and the UEs jointly take charge of the generation of the session key.

In the above-described embodiments of the methods for authentication and key agreement in a communication network, the network node is in charge of the group setup, the UE registration, the key generation and management, and the signature opening, which greatly reduces the overhead of the UEs.

In the above-described embodiments of the methods for authentication and key agreement in a communication network, any UE cannot know other UE's real identity based on the other UE's pseudonym identification and the signature. Only the network node knows the UE's real identity. Moreover the UE's pseudonym identification can be different from one communication session to another or periodically changed, and therefore a third party cannot track the privacy information of the UE.

In the above-described embodiments of the methods for authentication and key agreement in a communication network, the signatures are unlikable, which means it is computationally hard to decide whether two or more signatures are signed by the same UE. Moreover the pseudonym identifications are unlikable, which means that only the network node can link two or more pseudonym identifications of the same UE.

In the above-described embodiments of the methods for authentication and key agreement in a communication network, the signature is traceable. The network node can open the signature and trace the real identity of the signer from its pseudonym identification.

Figure 5:
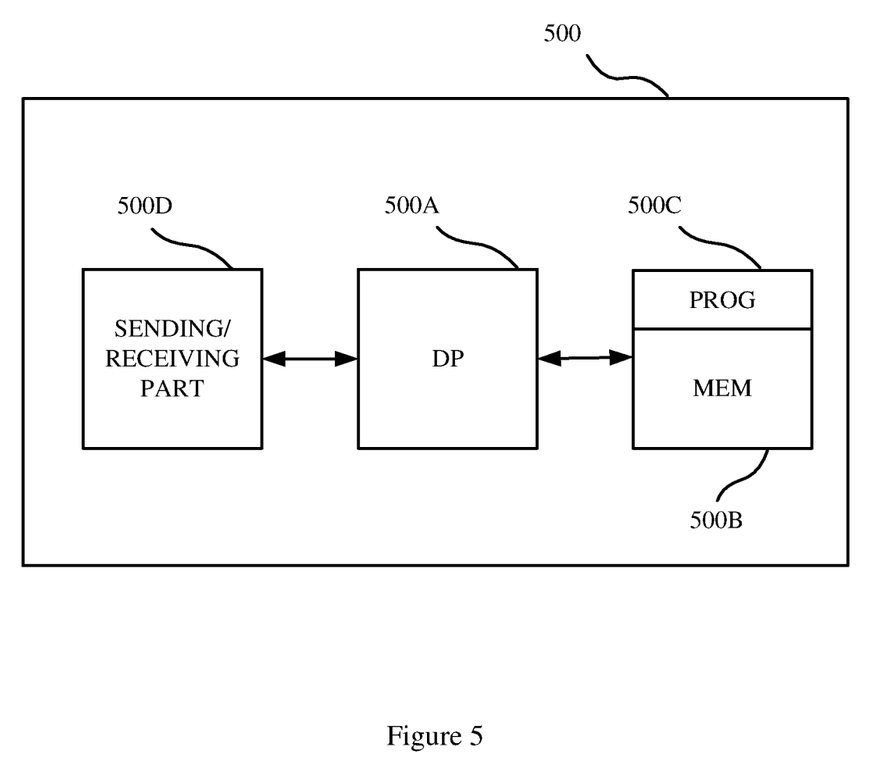
FIG. 5 is a schematic block diagram illustrating the apparatus for authentication and key agreement in a communication network according to embodiments of the present invention.

FIG. 5 is a schematic block diagram illustrating the apparatus 500 according to embodiments of the present invention. In FIG. 5, the apparatus 500 may comprise a data processor (DP) 500A, a memory (MEM) 500B that stores a program (PROG) 500C, and a sending/receiving part 500D.

In an embodiment, at least one of the PROG 500C is assumed to comprise program instructions that, when executed by the associated DP 500A, enable the apparatus 500 to operate in accordance with the exemplary embodiment of the method shown in FIG. 2, as discussed above. That is, the exemplary embodiment of the method shown in FIG. 2 may be implemented at least in part by computer software executable by the DP 500A of the apparatus 500, or by hardware, or by a combination of software and hardware.

In another embodiment, the program instructions can enable the apparatus 500 to operate in accordance with the exemplary embodiment of the method shown in FIG. 3, as discussed above.

The MEM 500B may be of any type suitable to the local technical environment and may be implemented using any suitable data storage technology, such as semiconductor based memory devices, flash memory, magnetic memory devices and systems, optical memory devices and systems, fixed memory and removable memory. The DP 500A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the invention may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention comprises any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. A method, comprising:
generating, at a network node, a common public key and a master secret key;
assigning, to a first user equipment, a first set of one or more pseudonym identifications corresponding to a real identity of the first user equipment, the common public key, and a first private key specific to the first user equipment, the first private key generated based on the real identity of the first user equipment, the common public key, and the master secret key;
assigning, to a second user equipment, a second set of one or more pseudonym identifications corresponding to a real identity of the second user equipment, the common public key, and a second private key specific to the second user equipment, the second private key generated based on the real identity of the second user equipment, the common public key, and the master secret key; and in response to a request for establishing a communication session between the first user equipment with a first pseudonym identification and the second user equipment with a second pseudonym identification,
generating a first secret key shared between the first user equipment and the network node,
generating a second secret key shared between the second user equipment and the network node, and
generating, based at least on the common public key, a first intermediate key for the first user equipment and a second intermediate key for the second user equipment, the first intermediate key and second intermediate key enabling the first user equipment and the second user equipment respectively to generate a session key for securing the communication session upon the first user equipment and the second user equipment successfully authenticating each other, the authenticating including the second user equipment verifying, based on the common public key, a first signature of the first user equipment generated using the first private key, and the authenticating further including the first user equipment verifying, based on the common public key, a second signature of the second user equipment generated using the second private key.

2. The method according to claim 1, further comprising: generating a random number;
generating the first intermediate key by at least performing a first exponentiation calculation on the common public key with a first exponent being a product of the second secret key and the random number; and
generating the second intermediate key by at least performing a second exponentiation calculation on the common public key with a second exponent being a product of the first secret key and the random number.

3. The method according to claim 1, wherein the first pseudonym identification is selected from the first set of pseudonym identifications of the first user equipment, and wherein the second pseudonym identification is selected from the second set of pseudonym identifications of the second user equipment.

4. The method according to claim 1, wherein the first set of one or more pseudonym identifications are assigned to the first user equipment during registration of the first user equipment with the network node, and wherein the second set of one or more pseudonym identifications are assigned to the second user equipment during registration of the second user equipment with the network node.

5. The method according to claim 1, further comprising:
receiving a message and a signature on the message;
verifying validity of the signature based on the common public key; and
recovering a real identity of a signer from the valid signature based on the master secret key.

6. An apparatus, comprising:
at least one processor; and
memory storing a program of instructions;
wherein the memory storing the program of instructions is configured to, with the at least one processor, cause the apparatus to at least:
generate a common public key and a master secret key;
assign, to a first user equipment, a first set of one or more pseudonym identifications corresponding to a real identity of the first user equipment, the common public key and a first private key specific to the first user equipment;
assign, to a second user equipment, a second set of one or more pseudonym identifications corresponding to a real identity of the second user equipment, the common public key and a second private key specific to the second user equipment; and
in response to a request for establishing a communication session between the first user equipment with a first pseudonym identification and the second user equipment with a second pseudonym identification,
generate a first secret key shared between the first user equipment and the network node,
generate a second secret key shared between the second user equipment and the network node, and
generate, based at least on the common public key, a first intermediate key for the first user equipment and a second intermediate key for the second user equipment, the first intermediate key and second intermediate key enabling the first user equipment and the second user equipment respectively to generate a session key for securing the communication session upon the first user equipment and the second user equipment successfully authenticating each other, the authenticating including the second user equipment verifying, based on the common public key, a first signature of the first user equipment generated using the first private key, and the authenticating further including the first user equipment verifying, based on the common public key, a second signature of the second user equipment generated using the second private key.

7. The apparatus according to claim 6, wherein the memory storing the program of instructions is configured to, with the at least one processor, cause the apparatus to:
generate a random number;
generate the first intermediate key by at least performing a first exponentiation calculation on the common public key with a first exponent being a product of the second secret key and the random number; and
generate the second intermediate key by at least performing a second exponentiation calculation on the common public key with a second exponent being a product of the first secret key and the random number.

8. The apparatus according to claim 6, wherein the first pseudonym identification is selected from the first set of pseudonym identifications of the first user equipment, and wherein the second pseudonym identification is selected from the second set of pseudonym identifications of the second user equipment.

9. The apparatus according to claim 6, wherein the first set of one or more pseudonym identifications are assigned to the first user equipment during registration of the first user equipment with the network node, and wherein the second set of one or more pseudonym identifications are assigned to the second user equipment during registration of the second user equipment with the network node.

10. The apparatus according to claim 6, wherein the memory storing the program of instructions is further configured to, with the at least one processor, cause the apparatus to at least:
maintain a first correspondence between the first real identity of the first user equipment and the first set of pseudonym identifications for the first user equipment; and maintain a second correspondence between the second real identity of the second user equipment and the second set of pseudonym identifications for the second user equipment.

11. An apparatus comprising:
at least one processor; and
memory storing a program of instructions;
wherein the memory storing the program of instructions is configured to, with the at least one processor, cause the apparatus to at least:
 obtain, from a network node, a set of one or more pseudonym identifications corresponding to a real identity of the apparatus, a common public key, and a first private key specific to the apparatus;
 send a request for establishing a communication session between the apparatus with
a first pseudonym identification and a user equipment with a second pseudonym identification;
 receive, from the network node, a first intermediate key for the apparatus;
 authenticate the user equipment including by verifying, based on the common public key, a first signature of the user equipment generated using a second private key of the user equipment; and
 in response to successfully authenticating the user equipment, generate, based at least on the first intermediate key, a session key for securing the communication session with the user equipment.

12. The apparatus according to claim 11, wherein the first pseudonym identification is selected from the set of pseudonym identifications.

13. The apparatus according to claim 11, wherein the first pseudonym identification differs from one communication session to another.

14. The apparatus according to claim 11, wherein the memory storing the program of instructions is further configured to, with the at least one processor, cause the apparatus to at least:

generate, based at least on the first private key, a second signature for a first message;
 send, to the user equipment, the first message including the first signature such that the user equipment verifies, based on the common public key, the validity of the second signature; and
 verify the validity of the first signature in response to receiving, from the user equipment, a second message including the first signature generated by the user equipment based on the second private key of the user equipment.

15. The apparatus according to claim 11, wherein the memory storing the program of instructions is further configured to, with the at least one processor, cause the apparatus to at least:
 generate the session key by at least performing an exponentiation calculation on the first intermediate key with an exponent being a secret key shared between the apparatus and the network node.

16. The apparatus according to claim 11, wherein the set of pseudonym identifications, the common public key, and the first private key are obtained during registration of the apparatus with the network node.

17. The apparatus according to claim 11, wherein the memory storing the program of instructions is further configured to, with the at least one processor, cause the apparatus to at least:
 transmit, to the network node, a received message including a signature such that the network node verifies, based on the common public key, the validity of the signature and recovers, based at least on the master secret key, a real identity of a signer from the signature.

18. The apparatus according to claim 11, wherein the network node is at least one of a mobile mobility entity (MME), a home subscriber server (HSS), or an authentication server.

* * * * *